(12) United States Patent
Nieuwenhuizen et al.

(10) Patent No.: US 6,611,296 B1
(45) Date of Patent: Aug. 26, 2003

(54) VIDEO SIGNAL ENHANCEMENT

(75) Inventors: Michel Wouter Nieuwenhuizen, Eindhoven (NL); Marina Marie Pierre Nicolas, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 350 days.

(21) Appl. No.: 09/627,138

(22) Filed: Jul. 27, 2000

(30) Foreign Application Priority Data

Aug. 2, 1999 (EP) .............................. 99202534

(51) Int. Cl.[7] .................. H04N 1/4096; H04N 5/21
(52) U.S. Cl. .................. 348/625; 348/672; 348/606; 382/168
(58) Field of Search ................... 348/625, 672, 348/606, 627, 252, 630, 631; 382/168, 266, 264, 263; 358/522, 532

(56) References Cited

U.S. PATENT DOCUMENTS

| | | | | |
|---|---|---|---|---|
| 4,571,635 A | * | 2/1986 | Mahmoodi et al. | 358/510 |
| 5,210,610 A | * | 5/1993 | Kanashiki et al. | 348/672 |
| 5,239,378 A | * | 8/1993 | Tsuji et al. | 348/625 |
| 5,294,986 A | * | 3/1994 | Tsuji et al. | 348/672 |
| 5,315,389 A | * | 5/1994 | Izawa et al. | 348/672 |
| 5,734,746 A | | 3/1998 | Jaspers | 382/169 |
| 5,848,181 A | | 12/1998 | Ogata | 382/159 |
| 5,959,696 A | * | 9/1999 | Hwang | 348/678 |
| 5,963,665 A | * | 10/1999 | Kim et al. | 382/169 |
| 6,038,341 A | * | 3/2000 | Takeshima et al. | 382/168 |
| 6,078,686 A | * | 6/2000 | Kim | 382/167 |
| 6,111,980 A | * | 8/2000 | Sano et al. | 382/167 |
| 6,130,724 A | * | 10/2000 | Hwang | 348/678 |
| 6,148,103 A | * | 11/2000 | Nenonen | 382/169 |
| 6,219,447 B1 | * | 4/2001 | Lee | 382/168 |
| 6,373,533 B1 | * | 4/2002 | Kawabata et al. | 348/672 |
| 6,392,764 B1 | * | 5/2002 | Eschbach et al. | 358/522 |
| 6,424,730 B1 | * | 7/2002 | Wang et al. | 382/128 |

* cited by examiner

*Primary Examiner*—John Miller
*Assistant Examiner*—Jean W. Désir
(74) *Attorney, Agent, or Firm*—Edward W. Goodman

(57) ABSTRACT

In a video signal enhancement method, a video signal (Y) is histogram-based processed to obtain a histogram-processed video signal (Y'), and a sharpness of the histogram-processed video signal (Y') is enhanced to obtain an output video signal (Y") in dependence upon a sharpness enhancement control signal (CS) derived from at least the histogram-processed video signal (Y'). Advantageously, the sharpness enhancement control signal (CS) represents a derivative of the histogram-processed video signal (Y').

6 Claims, 5 Drawing Sheets

VIDEO SIGNAL ENHANCEMENT

BACKGROUND OF THE INVENTION

1. Field of the Invention

The invention relates to a method and device for video signal enhancement, and to a display apparatus comprising such a video signal enhancement device.

2. Description of the Related Art

U.S. Pat. No. 5,734,746 discloses a picture signal enhancement circuit having a circuit for measuring a histogram of a picture signal, and a non-linear processing circuit for enhancing the picture signal in dependence upon the measured histogram.

U.S. Pat. No. 5,848,181 discloses an image processing apparatus for correctly extracting a uniform region having a small luminance level change from a noise-containing image. To this end, the image processing apparatus includes a differentiator for extracting a high frequency component of a luminous signal of the image within one screen, a histogram generating module for generating a histogram of the output value of the differentiator, a coefficient calculating module for analyzing the histogram to calculate a predetermined coefficient indicative of likeliness of the uniform region, and a pixel-position-depending coefficient producing module for establishing a correspondence relationship between the predetermined coefficient calculated by the coefficient calculating module and all of the pixel positions in the image in correspondence to the luminous level of the luminance signal from each of the pixel positions. The thus formed uniform region detecting apparatus is used in an edge enhancing apparatus in which an output of a uniform region detecting apparatus is applied to an edge enhancer that also receives the luminous signal. So, this prior art apparatus uses histogram detection only in uniform region detection.

SUMMARY OF THE INVENTION

It is, inter alia, an object of the invention to provide an improved video signal enhancement. To this end, the invention provides a method of enhancing a video signal.

In a video signal enhancement in accordance with the present invention, a video signal is histogram-based processed to obtain a histogram-processed video signal, and a sharpness of the histogram-processed video signal is enhanced to obtain an output video signal in dependence upon a sharpness enhancement control signal derived from at least the histogram-processed video signal. Advantageously, the sharpness enhancement control signal represents a derivative of the histogram-processed video signal.

These and other aspects of the invention will be apparent from and elucidated with reference to the embodiments described hereinafter.

DESCRIPTION OF THE PREFERRED EMBODIMENTS

In this specification, a local coupling between histogram modification and peaking is described. Histogram modification as commonly used amplifies some luminance levels at the cost of others. As a result, some transients in a picture are amplified more than others, resulting in a kind of local peaking. If we feed the output of the histogram modification to a peaking circuit, the signal will be peaked again, though now globally. Some parts are peaked twice and there is a danger of unrealistic "over-peaked" areas in a picture.

Figure 1:
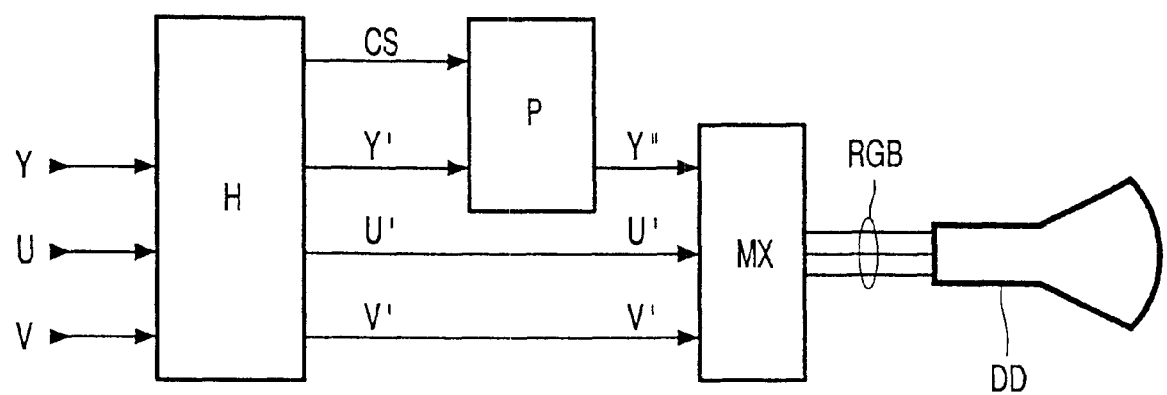
FIG. 1 shows a basic block diagram of a display apparatus comprising a video enhancement circuit having both a histogram modification and a peaking circuit.

The adaptation discussed in this document prevents the excessive peaking of some areas by providing a local coupling between histogram and peaking as indicated in FIG. 1. An input luminance signal Y and input chrominance signal UV are applied to a histogram modification unit H to obtain histogram-processed signals Y', U', and V' as well as a control signal CS. The control signal CS and the histogram-processed luminance signal Y' are applied to a peaking circuit P to obtain an output luminance signal Y". The output luminance signal Y" and the histogram-processed chrominance signals U', and V' are applied to a matrix circuit MX to obtain RGB signals that are displayed on a display device DD.

Figure 2A:
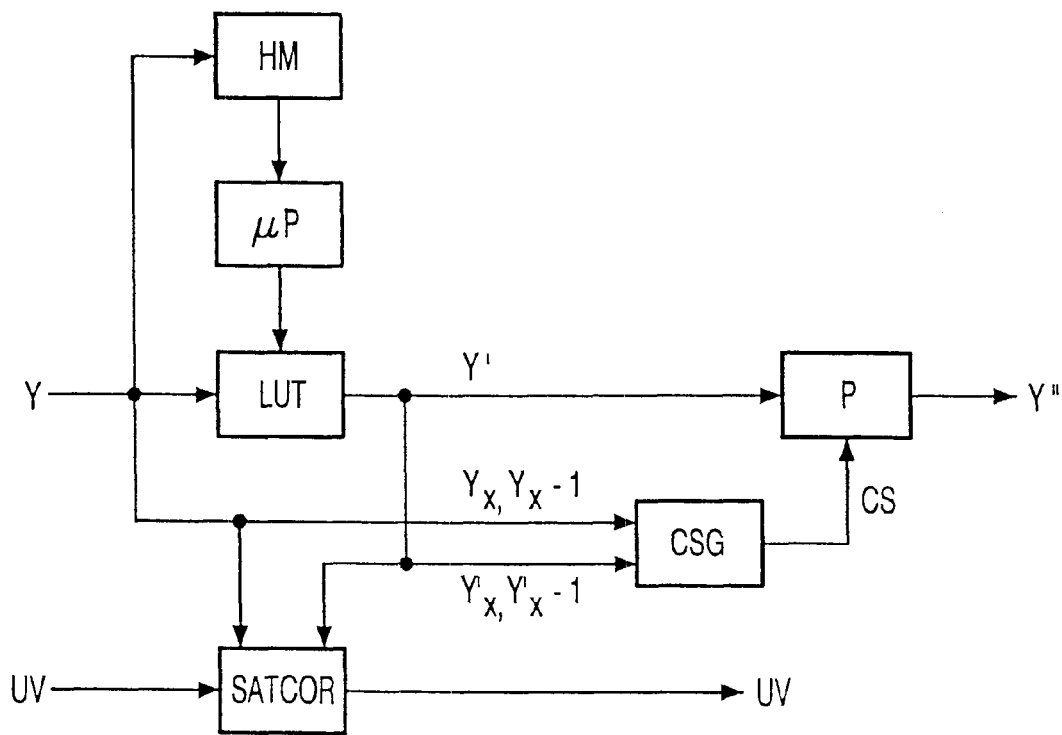
FIGS. 2A–2C show more elaborated block diagrams of a combination of histogram modification and peaking.

FIG. 2A shows the circuit of FIG. 1 in a little more detail, in which spatially different samples are used for local gain calculation. The input luminance signal Y is applied to a histogram measurement unit HM to obtain histogram output values. The histogram output values are applied to a microprocessor $\mu$P to calculate look-up table values representing a non-linear transfer curve. These look-up table values are stored in a look-up table LUT that is used to transform the input luminance signal Y into a histogram-processed luminance signal Y'. The input luminance signal Y and the histogram-processed luminance signal Y' are used to control a saturation correction unit SATCOR that processes the input chrominance signals UV into histogram-processed chrominance signals UV'. Compensation is needed for the chrominance signals U and V because a luminance value change will cause a saturation change. A control signal generator CSG derives the peaking control signal CS from the histogram-processed luminance signal Y' and the input luminance signal Y. For local gain, we need at least the information for two points (for instance, at the positions x, y and x−1, y), as explained hereinbelow.

Figure 2B:
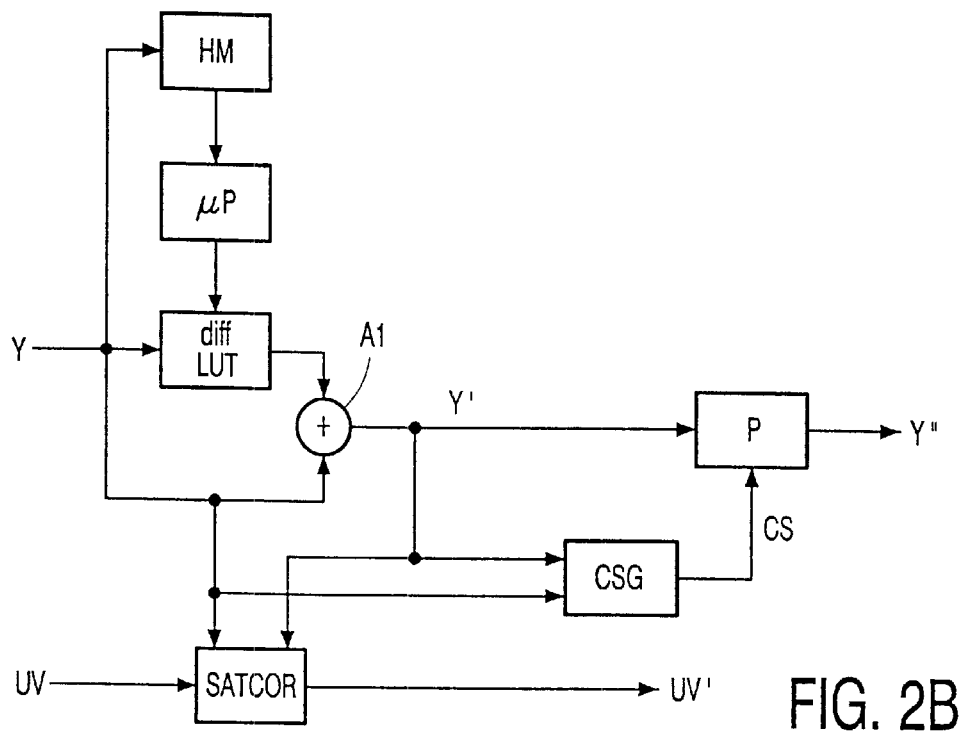

FIG. 2B shows an implementation with a differential LUT (diff LUT), still using spatially different samples for the local gain calculation. In practice, we do not apply a direct LUT, since it would mean more calculations with longer data words (9 or 10 bits) than an application that uses a differential LUT (i.e., the differences between Y and the wanted Y' are stored in the LUT). A differential LUT only needs 8 bits data words and, hence, is cheaper to implement. An adder A1 having inputs coupled to an input and an output of the differential LUT generates the histogram-processed luminance signal Y'.

Figure 2C:
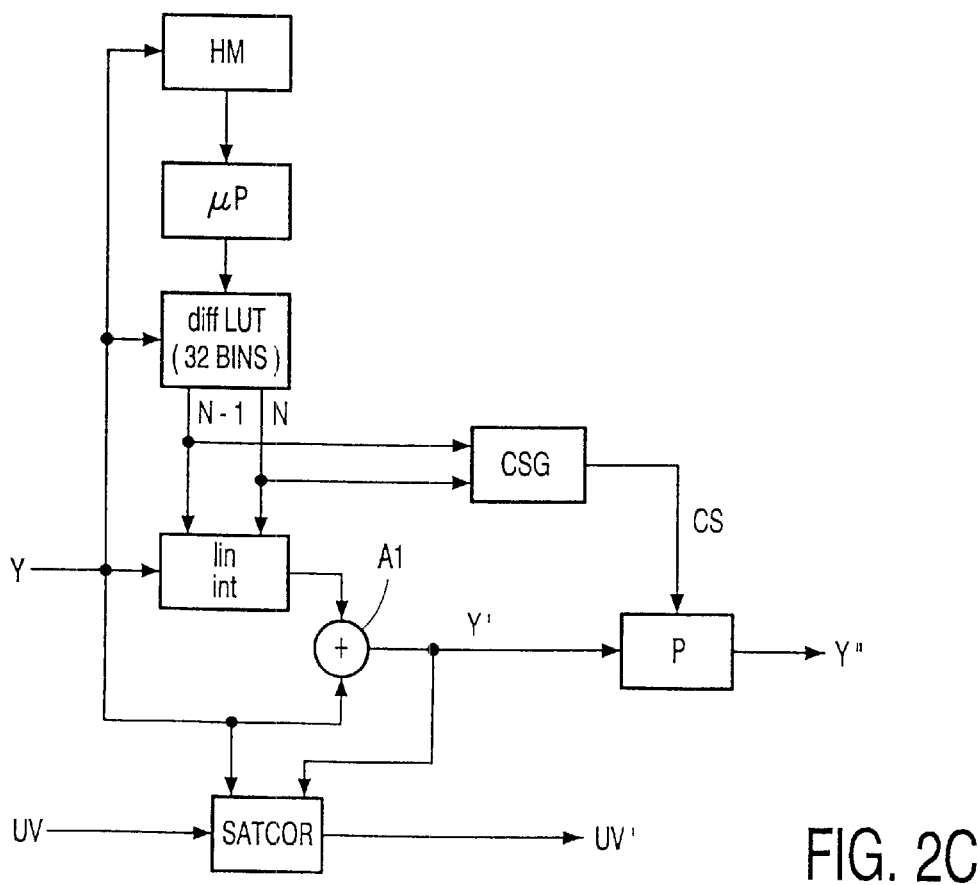

FIG. 2C shows a preferred embodiment with a differential LUT having a limited number of bins, using the difference between bins as a local gain estimate. The system of FIG. 2B is still somewhat complicated, because for each Y input value, there must be a separate entry in the LUT. With 9 bits video, this means 512 entries. In practice we use a much smaller LUT (32 entries) in combination with a (linear) interpolator to calculate intermediate output values. As explained hereinbelow, we can make use of the fact that we always need the N and N−1 output of the LUT for the interpolator. So instead of using x and x−1 (spatial difference), we use N and N−1 (amplitude-wise difference).

From the histogram modification, we extract, for each pixel, a signal CS that represents the local gain due to the histogram modification on that pixel. The total local gain on that pixel can be seen as the product of an original local gain due to the picture content at the place of the pixel, and the extra local gain due to the histogram modification. We use only this latter information to adapt the peaking for that pixel. Since histogram-based processing can both enhance and diminish local details, the local coupling can both increase and decrease the amount of peaking.

Before we discuss the algorithm of the coupling, it is important to note an essential difference between the transients' enhancements of histogram modification and peaking: histogram modification works on a local basis, but is frequency independent. So all frequencies are stretched in the same manner and no overshoots are created (though existing overshoots might be enhanced). On the other hand, peaking works only on the higher video frequencies and will normally create or enhance over- and undershoots. As we shall see this difference leads to some special measures that have to be taken in order to prevent artefacts.

At the histogram side, as local control signal CS we must have a signal that represents the gain applied by the histogram modification on each pixel. This gain cannot be derived from the Y' output itself but also needs the look-up table. The gain is defined by Total_local_gain(x,y)=local_histo_gain(x,y)*original_local_gain(x,y)

in which:
Total_local_gain(x, y)=gain at location x, y of the screen, after the histogram modification.
local_histo_gain(x, y)=additional gain applied by histogram at location x, y of the screen
original_local_gain(x, y)=gain due to original picture content at location x, y of the screen
$Y_{x,y}$=luminance at the input of the histogram modification at x, y
$f(Y_{x,y})$=processed output of the histogram modification at x, y
By definition, $$\text{original\_local\_gain}(x, y) = \frac{d(Y_{x,y})}{dx} \quad \text{and}$$

$$\text{Total\_local\_gain}(x, y) = \frac{d(f(Y_{x,y}))}{dx} \quad \text{leading to}$$

$$\text{local\_histo\_gain}(x, y) = \frac{d(f(Y_{x,y}))}{dY_{x,y}} \approx \frac{f(Y_{x,y}) - f(Y_{x-1,y})}{Y_{x,y} - Y_{x-1,y}}$$

Figure 3:
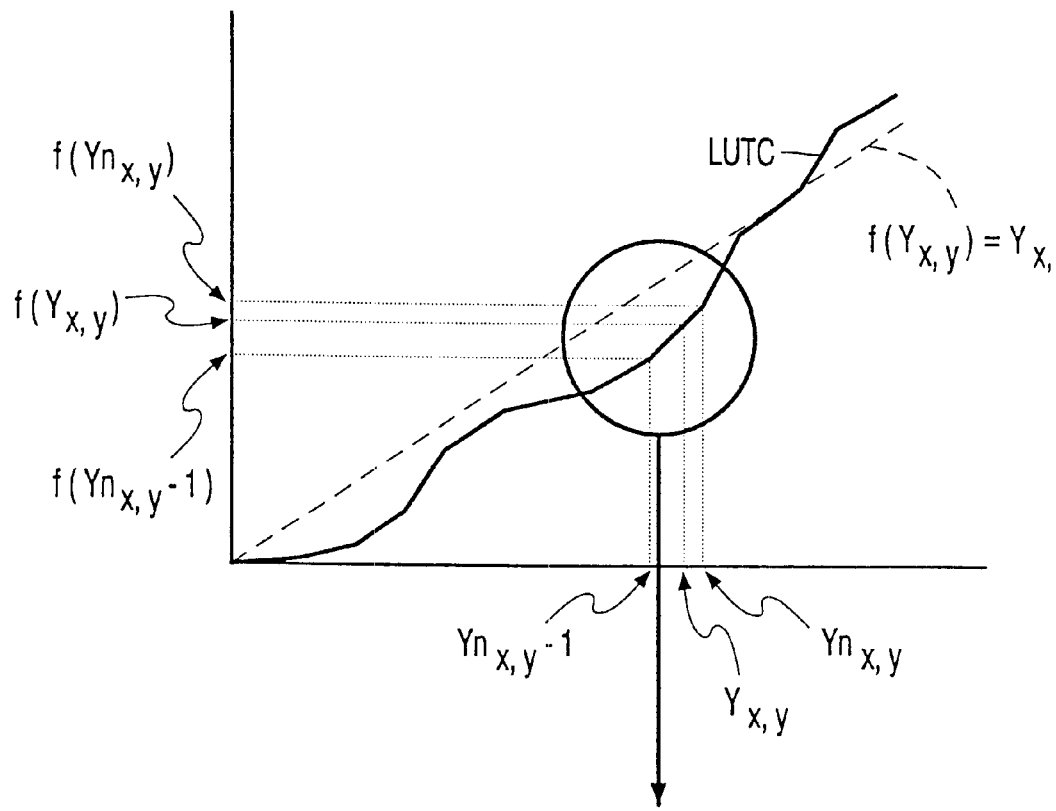
FIG. 3 illustrates the meaning of some terms.
Figure 3:
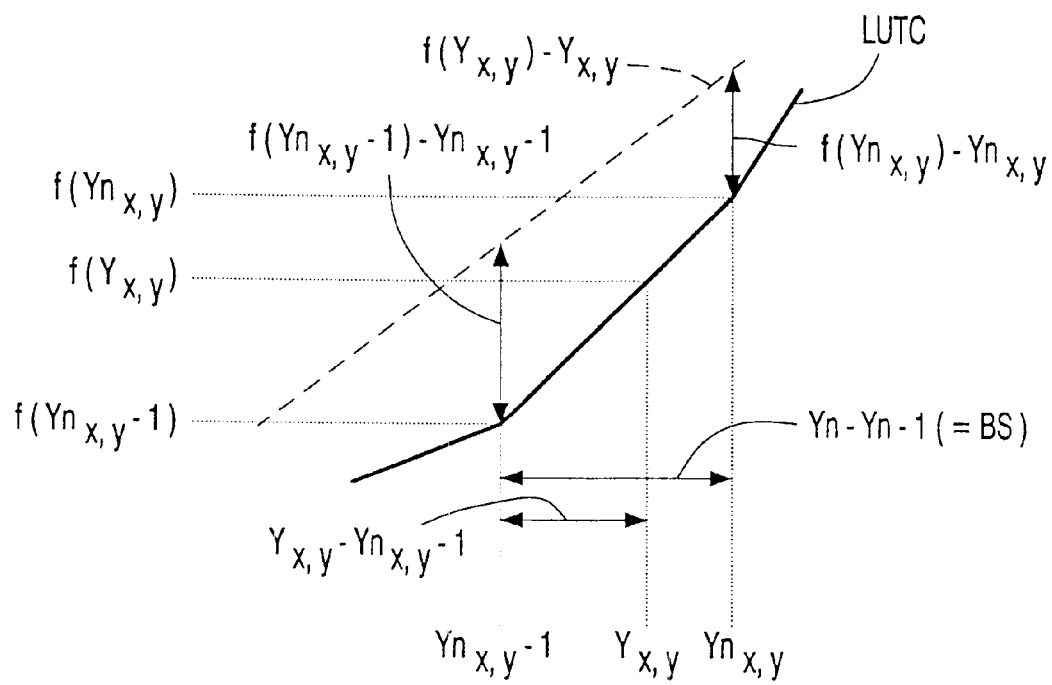

The LUT of the histogram modification has a limited number of entries (32 in our case). The input range for $Y_{x,y}$ is divided in 32 bins limited by the $Y_n$ values. In the LUT table, we only store the 32 $(f(Y_n)-Y_n)$ values. Within an interval $[Y_{n-1}, Y_n]$, the value $(f(Y_{x,y})-Y_{x,y})$ is obtained by linear interpolation. This is illustrated in FIG. 3, in which LUTC illustrates the LUT curve, and BS indicates the bin size of the differential LUT. In this way we get:

$$f(Y_{x,y}) = Y_{x,y} + (f(Y_{n(x,y)-1}) - Y_{n(x,y)-1}) + \frac{Y_{x,y} - Y_{n(x,y)-1}}{Y_n - Y_{n-1}} * ((f(Y_{n(x,y)}) - Y_{n(x,y)}) - (f(Y_{n(x,y)-1}) - Y_{n(x,y)-1}))$$

with:
n=0..31.
$Y_{n=0}$="black".
$Y_{n=31}$="white"
$Y_{n-1} < Y_{x,y} < Y_n$
LUT_step=$Y_n - Y_{n-1}$=512/32=16

We get a similar formula for $f(Y_{x-1,y})$ replacing x by x−1. This gives $$f(Y_{x,y}) - f(Y_{x-1,y}) =$$
$$Y_{x,y} - Y_{x-1,y} + (f(Y_{n(x,y)-1}) - Y_{n(x,y)}) - (f(Y_{n(x-1,y)-1}) - Y_{n(x-1,y)}) +$$
$$\left((f(Y_{n(x,y)}) - f(Y_{n(x,y)-1}) - \text{Lut\_step}) * \left(\frac{Y_{x,y} - Y_{n(x,y)-1}}{\text{LUT\_step}}\right)\right) -$$
$$\left((f(Y_{n(x-1,y)}) - f(Y_{n(x-1,y)-1}) - \text{Lut\_step}) * \left(\frac{Y_{x-1,y} - Y_{n(x-1,y)-1}}{\text{LUT\_step}}\right)\right)$$

Taking into account that, most of the time, the 2 neighboring pixels are highly correlated, there is a high chance that the 2 pixels belong to the same bin. In that case, $Y_{n(x,y)} = Y_{n(x-1,y)}$ and $Y_{n(x,y)-1} = Y_{n(x-1,y)-1}$ and the local difference reduces to $$f(Y_{x,y}) - f(Y_{x-1,y}) =$$
$$Y_{x,y} - Y_{x-1,y} + (f(Y_{n(x,y)}) - f(Y_{n(x,y)-1}) - \text{Lut\_step}) * \left(\frac{Y_{x,y} - Y_{(x-1,y)}}{\text{LUT\_step}}\right)$$

$$f(Y_{x,y}) - f(Y_{x-1,y}) = \left(f(Y_{n(x,y)}) - f(Y_{n(x,y)-1})\right) * \left(\frac{Y_{x,y} - Y_{(x-1,y)}}{\text{LUT\_step}}\right)$$

This gives $$\text{local\_histo\_gain}(x, y) = \frac{f(Y_{n(x,y)}) - f(Y_{n(x,y)-1})}{\text{LUT\_step}}$$

In this way, taking into account the spatial consistency of the luminance levels, we see that the local_histo_gain(x,y) value can be expressed as a difference between 2 Lut values of the histogram modification. This means that no local measurement at the pixel level is required. We only need to know to which bin the pixel belongs to retrieve the local_histo_gain(x,y) easily. Another advantage of this new formula is that a division by $Y_{n(x,y)} - Y_{n(x-1,y)}$ is avoided.

We could use this information directly, but we prefer to have a signal that is 0 when no adaptation is needed, so we subtract unity gain from the signal, which gives us:

$$\text{local\_differential\_gain}(x, y) = \frac{f(Y_n) - f(Y_{n-1})}{\text{LUT\_step}} - 1$$

Since we are dealing here with integers, we have to scale this signal to a relevant integer range. The easiest way to do this is by multiplying it with LUT_step:

local_adaptation(x,y)=$f(Y_n)-f(Y_{n-1})-LUT\_\text{step}$

In practical software implementations, the gain range of the histogram modification is limited to approximately −15 . . . 15. In theory, the range is −128 . . . 127, but since this will lead to absurd pictures, this range is never used and the software will apply limits to both the maximum and minimum gain. In the adaptation, we take the local_adaptation signal and clip it to −15 . . . 15. If the LUT is not active, the local_adaptation signal is made 0.

There is one important item to make the coupling work: histogram works on each pixel individually without reference to or use of other (surrounding) pixels. Peaking, on the other hand, is, by definition, spatially related. Peaking always uses neighboring pixels. We found out, that this difference is quite important: the whole idea is that we want to limit local gain induced by histogram and peaking together. However, since they work in a different domain, we must, in one way or another, make a translation between the domains. We see two ways to bridge the gap:

1. Calculate the local gain made by histogram by comparing different, but locally close pixels. This works probably, but in regions without any detail, the accuracy becomes a problem. The local gain can be expressed as $$\text{local\_gain} = \frac{Y'_{x,y} - Y'_{x-1,y}}{Y_{x,y} - Y_{x-1,y}}$$

If $Y_{x,y}$ and $Y_{x-1,y}$ are almost the same value, the accuracy will be bad. Another problem is that we need a real divider to calculate this. In most hardware and software solutions dividers are to be avoided because of their cost. This solution also requires a calculation on each pixel, whereas the result only depends on the luminance level and not on the place on the screen. This is in fact the solution of FIGS. 2A, 2B.

2. A second solution is to calculate the correction as explained by FIG. 2C. Here we use the values of two LUT bins to calculate the local gain. It avoids hardware/software division and is not sensitive to a little noise. There is also a disadvantage: because we calculate the gain of each individual pixel without reference to neighboring pixels, the estimate is not always correct. The assumption for this system to work is that neighboring pixels fall within the same or almost the same bin. Near large transients this is not the case. As explained hereinbelow, this leads to asymmetrical peaking.

Figure 4:
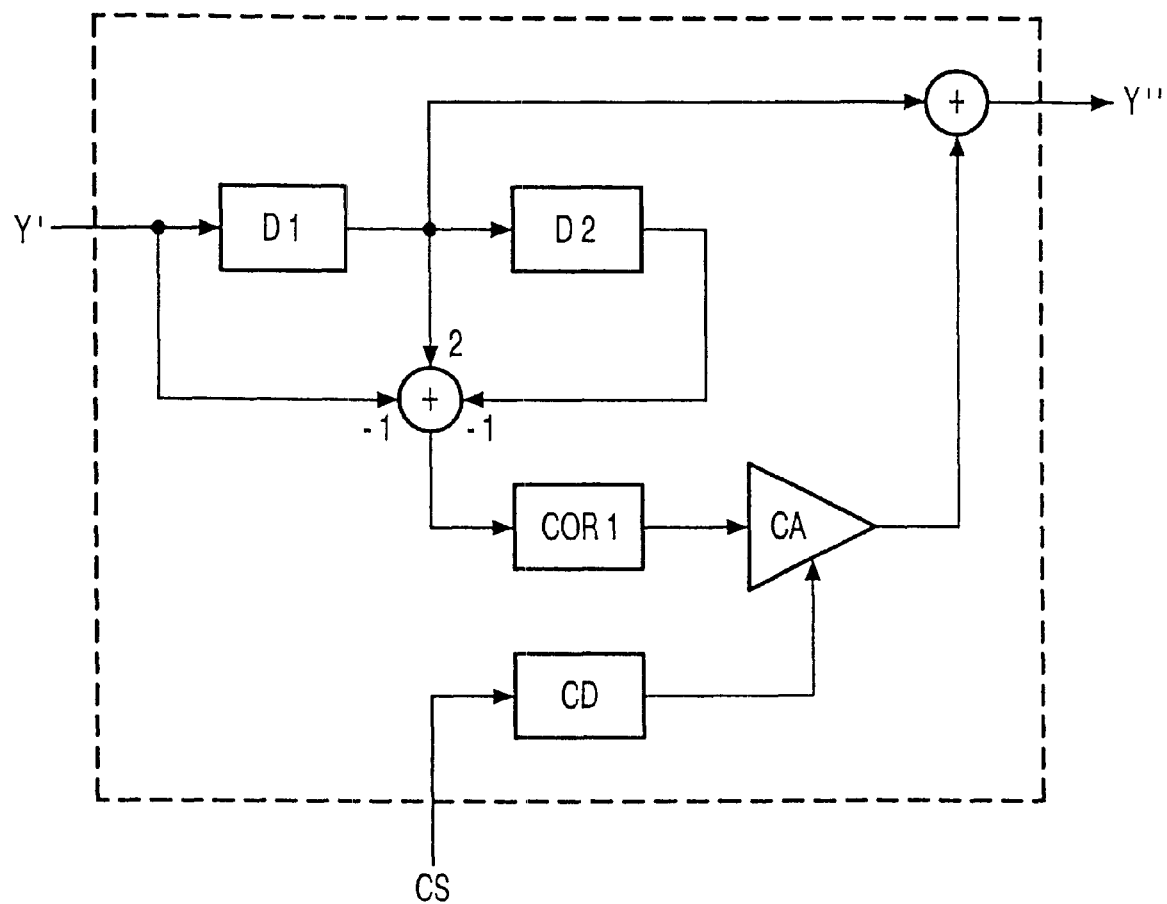
FIG. 4 shows a first block diagram of a peaking circuit for use in the invention.

FIG. 4 shows a first block diagram of a peaking circuit for use in the invention. The histogram-processed luminance signal Y' is applied to a FIR filter comprising a cascade arrangement of two delays D1, D2, and an adder for adding the signal Y' and the outputs of the delays in a ratio −1:2:−1. The thus obtained peaking signal is corrected for noise influence and other artifacts by applying coring, etc., in a circuit COR1. The output of this circuit COR1 is then fed to a controlled amplifier CA that multiplies the cored peaking signal by the control signal CS delayed by a compensating delay CD. The result is added to the delayed luminance signal from the delay D1 and form the output signal Y".

Figure 5:
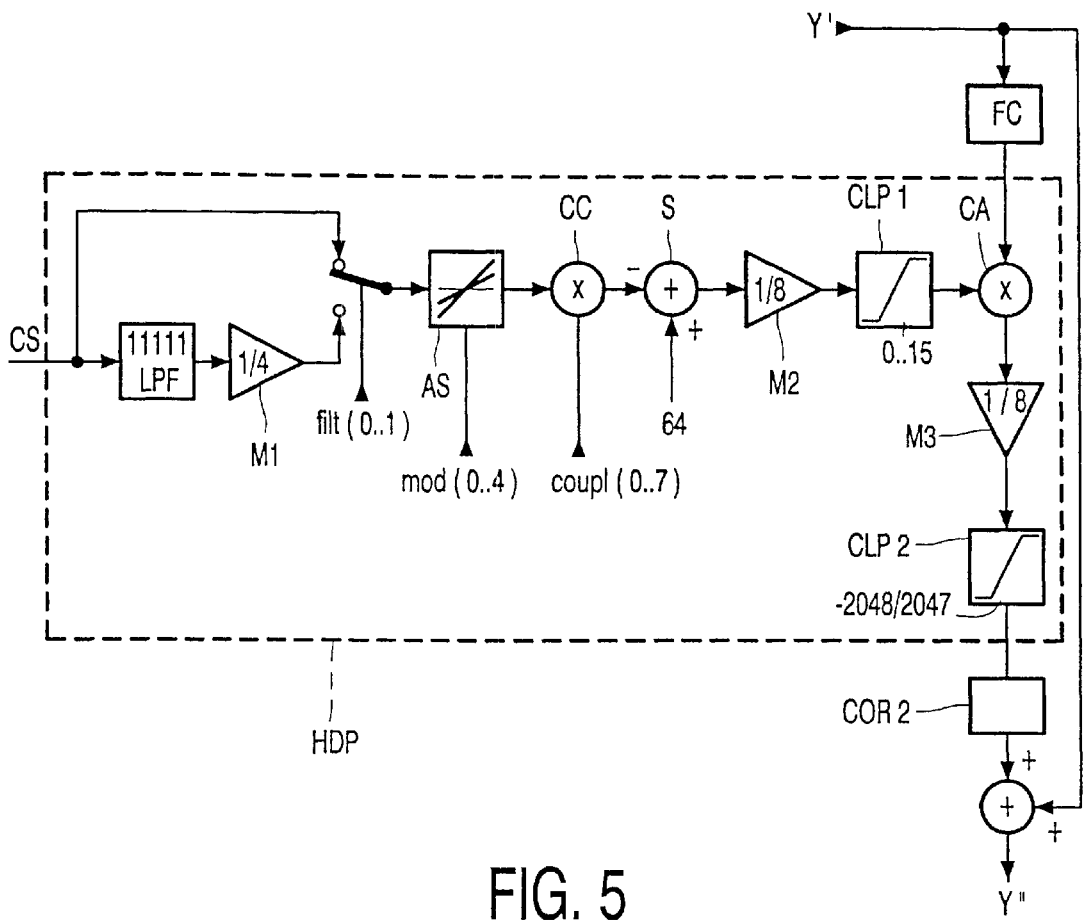
FIG. 5 shows a preferred block diagram of a peaking circuit for use in the invention.

FIG. 5 shows a preferred block diagram of a peaking circuit for use in the invention. Herein, the control signal CS generated by the histogram modification, is fed to an input of a Horizontal Dynamic Peaking block HDP. There, it is used to modify the amount of peaking. It is important that the modification does not interfere with other features. Therefore, the histogram-based modification is applied before the coring, which is preferable, because making the correction before the coring will allow an optimal noise reduction.

We will now discuss the block diagram of FIG. 5 in some detail. The luminance signal Y' is fed to a filter circuit FC that may comprise a low-pass filter, a band-pass filter and/or a high-pass filter. An output signal of the filter circuit FC is multiplied by the voltage-controlled amplifier VCA with a signal derived from the control signal CS.

The control signal CS is preferably filtered with a 1,1,1, 1,1 filter LPF. The switch filt (0..1) determines whether the low-pass filter is active. The need for this filter LPF is most present with a relatively large transient (dark-grey to almost white) in the input signal. If we have a histogram modification that applies a lot of gain to dark signals and diminishes the local gain of light parts, the control signal CS will be high before the transient and small (<0) after it. This results in the peaking being enhanced before the transient and diminished after it. This results in asymmetric peaking. This is something that we do not want, because it might result in nasty rims around edges. Therefore we apply the low-pass filter LPF that averages the control signal CS such that both over and undershoot become more or less equal again. Note that the filter LPF plus subsequent attenuator M1 have an overall gain of 5/4. This is an acceptable trade-off between performance and silicon area. The 11111 (or similar) filter that is used in the preferred implementation is, in fact, doing the translation of the amplitude domain into the spatial domain. So the filter is much more than just a small improvement; it makes the system work at places where neighboring pixels do not fall in the same LUT bin.

Figure 6:
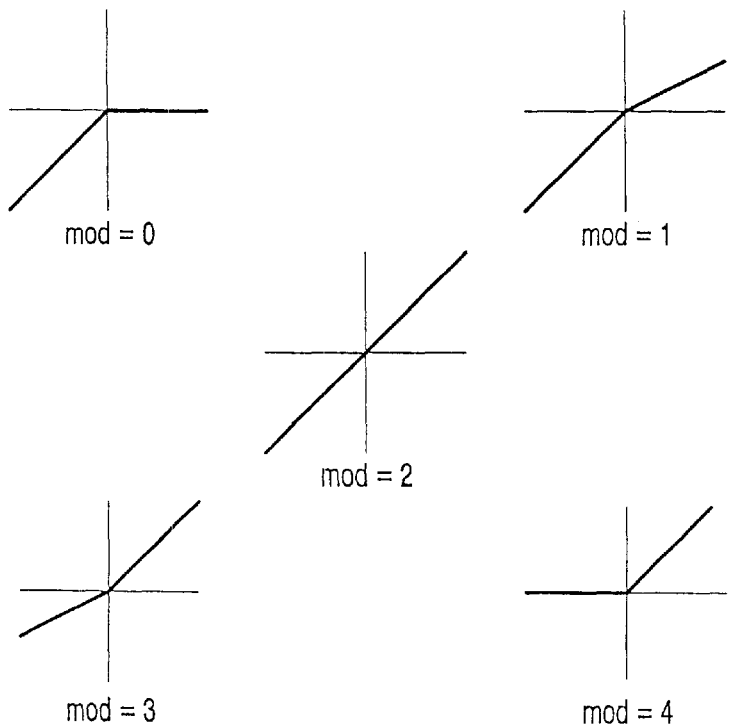
FIG. 6 shows examples of asymmetry correction with the mode parameter in the peaking circuit of FIG. 5.

Next is an asymmetry control AS. This is included to adapt the system to the taste of the set designer. Some designers might want to enhance the peaking more than to decrease it, or the other way around. The proposed asymmetry control has 5 positions as indicated in FIG. 6. A mode signal mod indicates which asymmetry correction curve is active.

Next we determine the amount of correction by multiplying (couple control CC) with a "couple" parameter couple which has a range of 0 . . . 7. An approximately 1:1 coupling is available at position 3 or 4.

The resulting signal is 0 when the histogram did not change the local gain. We must adapt this signal into a signal that indicates the amount of peaking wanted (i.e., an unsigned signal). We do this by subtracting (subtracter S) the output signal of the couple control CC from 64 (note that the range of the output signal of the couple control CC at is nominal −60 . . . +60 when couple=4), which gives a range (couple=4) of 4 . . . 124. The result we divide by 8 (range 0 . . . 15) by means of a multiplier M2. So at these nominal positions, we do not have to clip. If, however, we increase couple, clipping by means of clipper CLP1 becomes necessary, because a signal a <0 results in de-peaking and >15 will increase the peaking locally with more than 6 dB. Both situations are unwanted.

The multiplier M3 (division by 8) is present as clipper CLP1 outputs a multiplier between 0 and 15 so that a multiplication is possible by a factor ranging from 0 to 15, which is too large. The clipper CLP2 is present to correct overflows that might occur if the couple factor exceeds 3. The optional circuit COR2 controls the amount of peaking as a function of the size of the transient: very small transients are not passed (=coring function), somewhat larger transients are passed, but very large transients are not passed to prevent ugly edges from occurring.

The algorithm was tried extensively using still pictures (both scanned photos and grabbed TV pictures). The coupling works well and no artifacts were noted. In general, pictures seem to become slightly less sharp, an effect that is caused by the black stretch function of the histogram block. Without black stretch, the black and white points of a picture would remain the same and hence the average gain would also be unity (averaged over all luminance levels). Due to the black stretch, the overall gain becomes slightly more than one and so the coupling will in general reduce peaking slightly. This can be solved in two ways: just set the peaking a little higher, or take information from the histogram algorithm and extract information of it to globally increase the peaking if there is a lot of black stretching. On the plus side: we see that excessive peaking in dominant parts of the screen is reduced. This is most noticeable in, e.g., water and in grass/plants. Without the 1,1,1,1,1 filter LPF, the asymmetry of large transients is rather noticeable.

Conclusions: the histogram-peaking coupling gives a small but visible improvement in that excessive peaking is reduced, although it must be said that the weighting of the result depends on personal taste. "Over-peaking" is reduced, but this might give the impression of somewhat less sharpness. This effect can be solved by either statically or dynamically adapting the global peaking parameters somewhat. The hardware consequences are limited (a five-tap 1,1,1,1,1 filter (5 bits), two multipliers (3*6 bits and 4*10 bits) three clippers and some selection logic).

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

What is claimed is:

1. A method of video signal enhancement, comprising the steps:

histogram-based processing a video signal to obtain a histogram-processed video signal; and enhancing a sharpness of the histogram-processed video signal to obtain an output video signal, wherein said sharpness enhancing step includes the steps:

deriving a sharpness enhancement control signal from at least said histogram-processed video signal, said sharpness enhancement control signal representing a derivative of said histogram-processed video signal; and processing said histogram-processed video signal in dependence on the sharpness enhancement control signal to obtain said output video signal.

2. The method as claimed in claim 1, wherein said sharpness enhancement control signal deriving step includes the step:

using two subsequent outputs of a differential look-up table used in the histogram-based processing step, to obtain an estimate of a local gain for a current luminance pixel.

3. The method as claimed in claim 1, wherein the processing step includes the step:

spatially low-pass filtering the sharpness enhancement control signal.

4. A video signal enhancement device, comprising:

means for histogram-based processing a video signal to obtain a histogram-processed video signal; and means for enhancing a sharpness of the histogram-processed video signal to obtain an output video signal, wherein said sharpness enhancing means comprises:

means for deriving a sharpness enhancement control signal from at least said histogram-processed video signal, said deriving means forming a derivative of said histogram-processed video signal to represent said sharpness enhancement control signal; and means for processing said histogram-processed video signal in dependence on said sharpness enhancement control signal to obtain said output video signal.

5. A video signal display apparatus, comprising:

the video signal enhancement device as claimed in claim 4; and a display device coupled to an output of the video signal enhancement device.

6. A method of video signal enhancement, comprising the steps:

histogram-based processing a video signal to obtain a histogram-processed video signal; and enhancing a sharpness of the histogram-processed video signal to obtain an output video signal, wherein said sharpness enhancing step includes the steps:

deriving a sharpness enhancement control signal from at least said histogram-processed video signal; and processing said histogram-processed video signal in dependence on the sharpness enhancement control signal to obtain said output video signal, wherein the processing step includes the step:

spatially low-pass filtering the sharpness enhancement control signal.

* * * * *